G. A. LEE.
SPEED RECORDER.
APPLICATION FILED APR. 29, 1908.
912,003.
Patented Feb. 9, 1909.
4 SHEETS—SHEET 1.
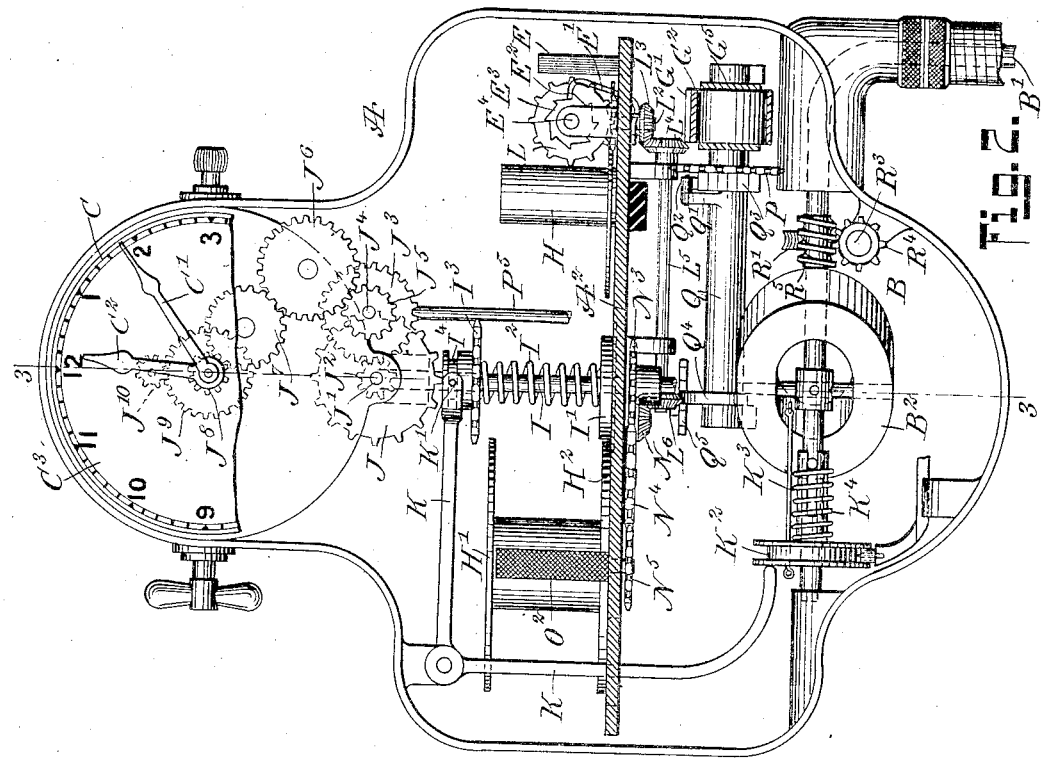
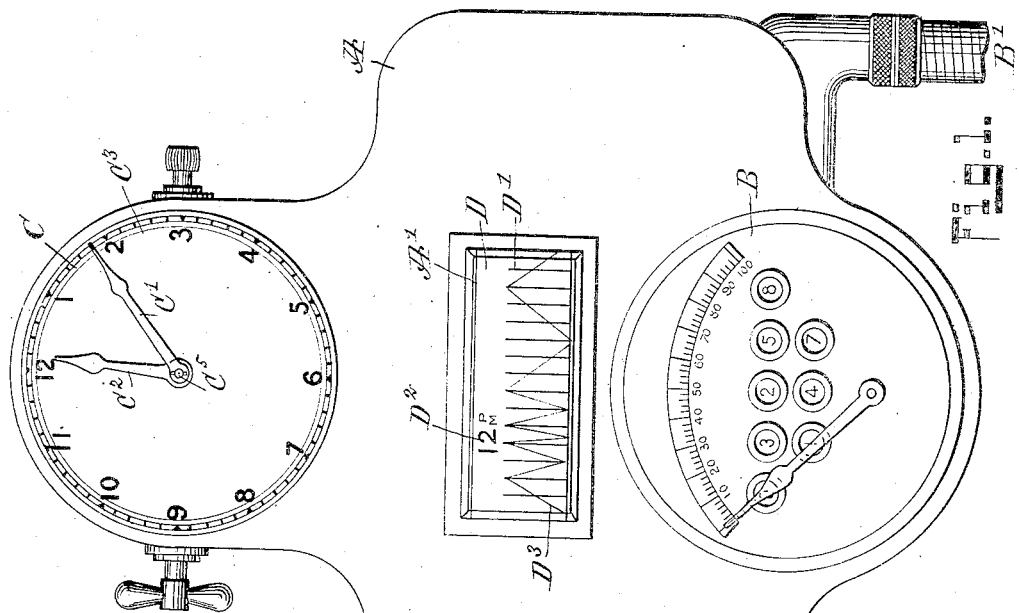
WITNESSES
INVENTOR
George A. Lee
BY
ATTORNEYS

G. A. LEE.
SPEED RECORDER.
APPLICATION FILED APR. 29, 1908.

912,003.

Patented Feb. 9, 1909.

4 SHEETS—SHEET 2.

WITNESSES
Chas. A. Clark.

INVENTOR
George A. Lee
BY
ATTORNEYS

G. A. LEE.
SPEED RECORDER.
APPLICATION FILED APR. 29, 1908.

912,003.

Patented Feb. 9, 1909.
4 SHEETS—SHEET 3.

WITNESSES
Chas. A. Clark.
Rudy Hoster

INVENTOR
George A. Lee
BY Munn & Co.
ATTORNEYS

G. A. LEE.
SPEED RECORDER.
APPLICATION FILED APR. 29, 1908.

912,003.

Patented Feb. 9, 1909.
4 SHEETS—SHEET 4.

WITNESSES
Chas. A. Clark.
Rudy. Hoster

INVENTOR
George A. Lee
BY Munn & Co.
ATTORNEYS

UNITED STATES PATENT OFFICE.

GEORGE A. LEE, OF NEW YORK, N. Y., ASSIGNOR, BY MESNE ASSIGNMENTS, TO RECOMETRE COMPANY OF AMERICA, OF NEW YORK, N. Y., A CORPORATION OF NEW YORK.

SPEED-RECORDER.

No. 912,003.   Specification of Letters Patent.   Patented Feb. 9, 1909.

Application filed April 29, 1908.  Serial No. 429,840.

*To all whom it may concern:*

Be it known that I, GEORGE A. LEE, a citizen of the United States, and a resident of the city of New York, borough of Manhattan, in the county and State of New York, have invented a new and Improved Speed-Recorder, of which the following is a full, clear, and exact description.

The object of the invention is to provide a new and improved speed recorder, more especially designed for use on automobiles and other vehicles, and arranged to graphically produce and display to the occupant of the vehicle, the speed the vehicle is traveling at the time, and to form a permanent record of the speed of the vehicle while the latter is running, the record showing the time, mileage and speed per hour.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 3:
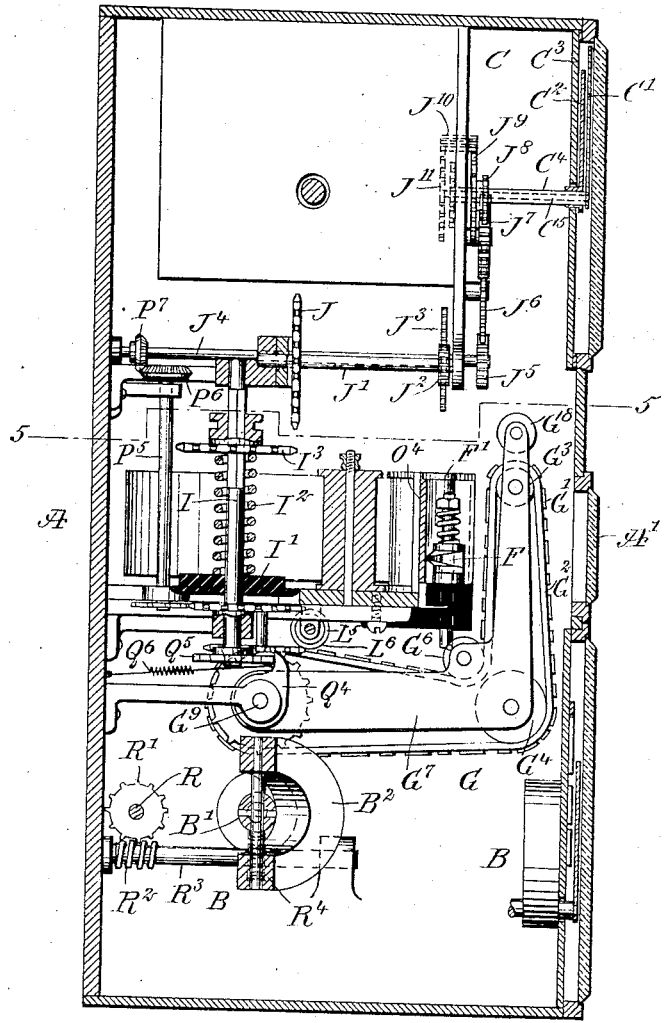
Figure 4:
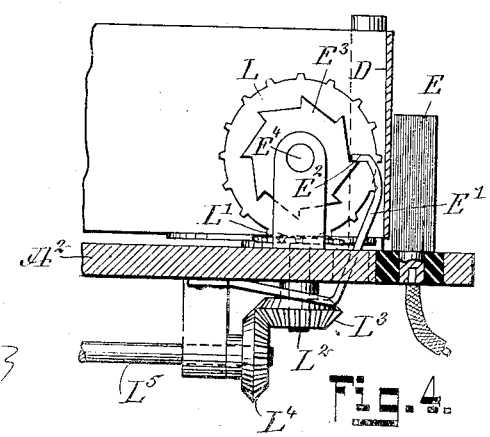
Figure 5:
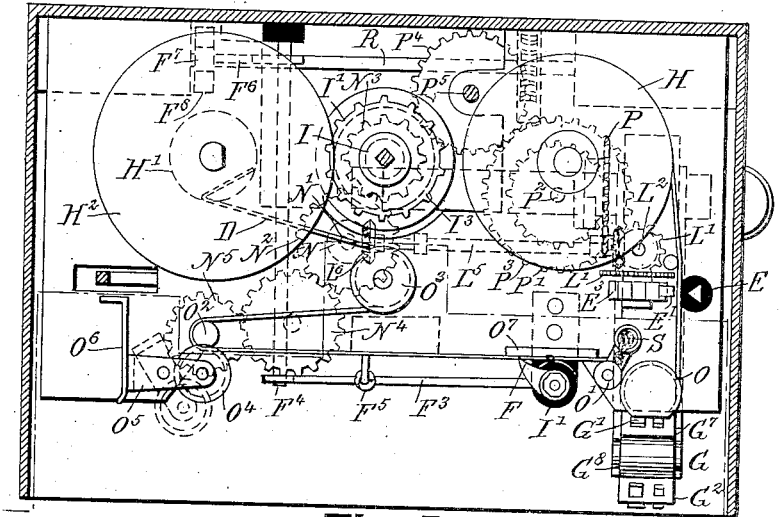
Figure 6:
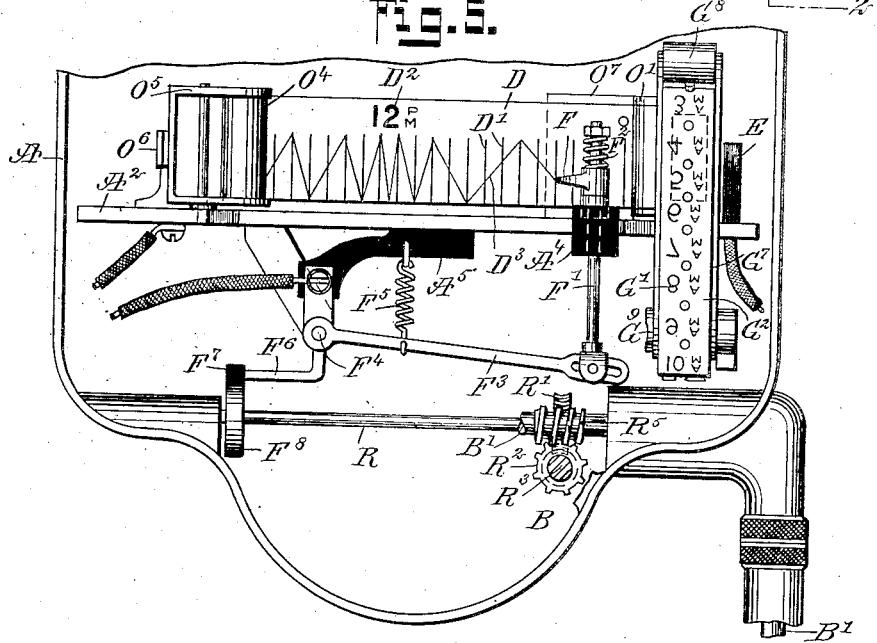
Figure 7:
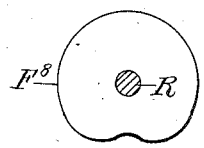
Figure 8:
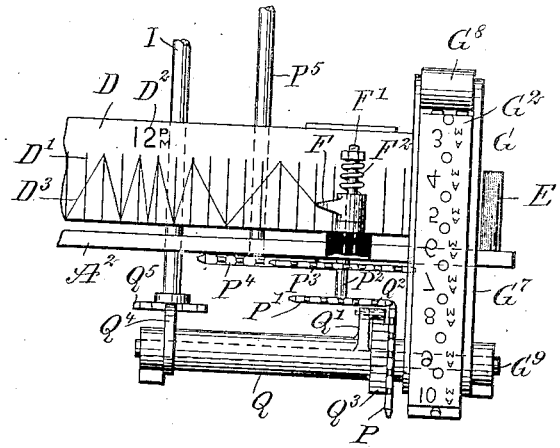
Figure 9:
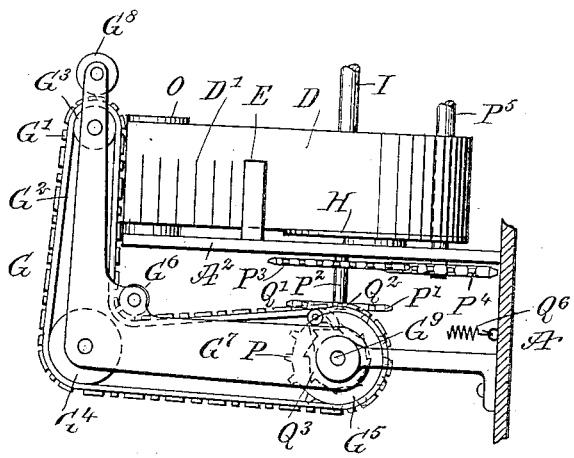
Figure 10:
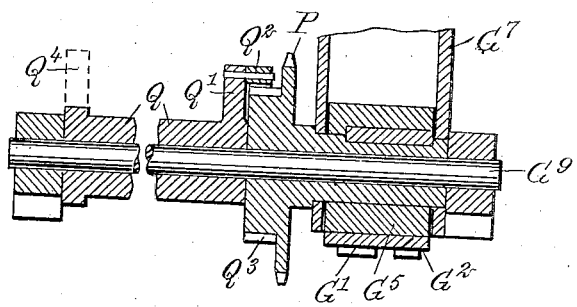

Figure 1 is a front elevation of the improvement; Fig. 2 is a sectional front view of the same, on the line 2—2 of Fig. 5; Fig. 3 is a transverse section of the same on the line 3—3 of Fig. 2; Fig. 4 is an enlarged front elevation of the device for making the minute lines on the record blank; Fig. 5 is a sectional plan view of the improvement on the line 5—5 of Fig. 3; Fig. 6 is a front elevation of the same, the cover of the casing being removed; Fig. 7 is a face view of the actuating cam of the distance indicator; Fig. 8 is a front elevation of the record blank, the distance indicator and the time-printing device; Fig. 9 is a side elevation of the same, and Fig. 10 is an enlarged sectional side elevation of the mechanism for imparting a swinging motion to the time printing device.

In the speed recorder presently to be described in detail, use is made of a record blank, caused to travel only when the vehicle is running, and on this record blank are produced time lines, the time and distance lines, the latter extending across the time lines, to indicate the time, mileage and speed per hour. The means for producing the time lines and the time are actuated by a clock-driven mechanism, controlled by a speedometer, to render the device inactive while the vehicle is at a standstill, and the means for producing the said distance lines are controlled solely by the speedometer, which may be of any approved construction.

In carrying out the invention in a practical manner, use is preferably made of a record blank, chemically treated, to be affected by electric printing devices.

In a suitably constructed casing A is mounted a speedometer or a speed indicator B of any approved construction, and driven by a flexible shaft B', connected in the usual manner with a rotating part of the vehicle on which the speed recorder is used. In the casing A is also mounted a clockwork C, having the usual hands C', $C^2$ and a dial $C^3$ for indicating the time of the day or night.

Through a glass cover A' in the front of the casing A is visible a record in the form of a record blank D, preferably a strip of paper, and on which blank are marked spaced vertical minute lines D', the time $D^2$ and the distance line $D^3$, as indicated in Figs. 1 and 6. The record blank D travels only when the vehicle is running, and the paper of which the record blank D is made is chemically prepared with a solution of potassium bromid, to allow of marking the lines D' and $D^3$ electrically thereon by electric circuits and by contact of the paper with a bar E, and a tracer or a stylus F, respectively. The time $D^2$ is printed by the use of a type-printing device G.

The record blank D unwinds from a spool H and winds up on a spool H', the spools being journaled in suitable bearings arranged on a cross-plate $A^2$ held within the casing A. The bottom flange $H^2$ of the winding-up spool H' is in contact with a disk I', secured on a shaft I, journaled in suitable bearings in the casing A, and on the said shaft I is coiled a spring $I^2$ pressing on a gear wheel $I^3$, mounted to slide on or to turn with the shaft I. The gear wheel $I^3$ is adapted to mesh with a gear wheel J secured on a transverse shaft J', journaled in suitable bearings in the casing A, and provided with a pinion $J^2$ in mesh with a gear wheel $J^3$ attached to a shaft $J^4$ likewise extending transversely and journaled in suitable bearings in the casing A. On the front end of the shaft $J^4$ is attached a pinion $J^5$ in mesh with a gear wheel $J^6$, meshing with an intermediate gear wheel $J^7$ in mesh with a pinion $J^8$ mounted to rotate loosely on a sleeve $C^4$ carrying the hour hand $C^2$, the said pinion $J^7$ having a gear wheel $J^9$ in mesh with a pinion $J^{10}$ meshing with a gear wheel $J^{11}$, secured to the spindle $C^5$ carrying the minute hand $C'$. Now when the clock C is running, the above-described gearing, consisting of the wheels $J^{11}$, $J^{10}$, $J^9$, $J^8$, $J^7$, $J^6$, $J^5$, $J^3$, $J^2$ and J, is driven from the minute arbor $C^5$ and when the gear wheel $I^3$ is in mesh with the gear wheel J, then the shaft I is rotated, and the rotary motion of the latter is transmitted by the flange $H^2$ and the disk $I'$ to the spool $H'$, to wind up the record blank D onto the spool $H'$ and to unwind the same from the spool H.

When the vehicle is at a standstill, the gear wheel $I^3$ is held out of mesh with the gear wheel J by a restraining device controlled by the usual governor $B^2$, held on the shaft $B'$ of the speedometer B, and when the vehicle is running the restraining device mentioned allows the gear wheel $I^3$ to be moved in mesh with the gear wheel J by the action of the spring $I^2$. The restraining device mentioned consists essentially of a shifting lever K, connected at one end by a pin $K'$ with an annular groove $I^4$ on the hub of the gear wheel $I^3$, the other arm of the shifting lever K resting against one side of a wheel $K^2$ connected by a link $K^3$ with the governor $B^2$ of the speedometer B, so that when the vehicle is running, the governor $B^2$ pulls by the link $K^3$ on the wheel $K^2$, thus drawing the latter away from the arm of the shifting lever K and thereby allowing the spring $I^2$ to move the gear wheel $I^3$ upward in mesh with the gear wheel J. The wheel $K^2$ is pressed on by a spring $K^4$, so that when the governor $B^2$ ceases to run, then the spring $K^4$ pushes the wheel $K^2$ outward, thus actuating the shifting lever K, with a view to move the gear wheel $I^3$ out of mesh with the gear wheel J (see Fig. 2). From the foregoing, it will be seen that the record blank D is caused to travel by a driving gear driven by the clock C, but the said blank D only travels when the vehicle is running and remains stationary during the time the vehicle is at a standstill, owing to the said driving gearing being thrown in and out of gear by the above-described shifting device actuated by the speedometer.

The record blank D after leaving the unwinding roller H passes towards the front of the casing A and between the bar E (see Figs. 4 and 5), and a presser arm $E'$ in the form of a spring, secured at one end to the plate $A^2$ and having its free end $E^2$ curved and in engagement with the peripheral face of a cam wheel $E^3$, so that when the latter is rotated the arm $E'$ is periodically forced outward, to press the record blank D against the sharp vertical edge of the metallic bar E, with a view to produce a minute line $D'$ on the record blank, D. The metallic bar E is preferably made triangular and insulated on the plate $A^2$, and the said bar E is connected with one electrode of a battery, having its other electrode connected with the plate $A^2$ (see Fig. 6), on which the shaft $E^4$ of the cam wheel $E^3$ is journaled. Now when the arm $E'$ is forced outward by the cam wheel $E^3$ and presses the record blank D against the bar E, then the circuit is closed, and the electric current in passing from the arm $E'$ by way of the prepared record blank D to the bar E, causes the latter to produce a minute line $D'$ on the record blank D, as plainly indicated in the drawings. The cam wheel $E^3$ is driven from the shaft I, which latter also drives the winding-up spool $H'$, and the arrangement is such that when the vehicle is in use, a line $D'$ is produced at every minute on the record blank, and as the latter is traveling at the time, the lines $D'$ are spaced equidistant apart, as shown in the drawings.

In order to rotate the cam shaft $E^4$ from the shaft I, the following arrangement is made: On the cam shaft $E^4$ is secured a gear wheel L in mesh with a pinion $L'$ attached to a vertical shaft $L^2$ journaled in the plate $A^2$, and on the said shaft $L^2$ is secured a bevel gear wheel $L^3$ in mesh with a bevel gear wheel $L^4$ secured on a shaft $L^5$, journaled in suitable bearings arranged on the under side of the plate $A^2$. On the shaft $L^5$ is secured a bevel gear wheel $L^6$ in mesh with a bevel gear wheel N attached to a shaft $N'$ journaled in the plate $A^2$, and on the said shaft $N'$ is secured a gear wheel $N^2$ in mesh with a gear wheel $N^3$ secured on the lower end of the shaft I. Thus when the latter is rotated, as above described, and at the time the gear wheel $I^3$ is in mesh with the gear wheel J, then a rotary motion is transmitted by the gear wheels $N^3$, $N'$, N and $L^6$ to the shaft $L^5$, which by the gear wheels $L^4$, $L^3$, shaft $L^2$ and gear wheels $L'$ and L rotates the cam shaft $E^4$, to cause the cam wheel $E^3$ to periodically actuate the spring arm $E'$ with a view to press the record blank D against the sharp edge of the bar E. When this takes place the circuit is closed, as previously mentioned, and a line is marked on the record blank, and this takes place at every minute, so that the lines $D'$ are spaced apart. It is understood that when the gear wheel $I^3$ is out of mesh with the gear wheel J, then the above-described mechanism is at a standstill and the record blank is loose between the bar E and the spring arm $E'$, and the circuit remains open.

The record blank D after its passage between the bar E and the spring arm $E'$, passes around the flat side of a platen O, erected on the plate $A^2$, and while the blank D is on the flat face of the platen O it receives impressions from the type $G'$ indicating hours and arranged on an endless apron $G^2$ passing over rollers $G^3$, $G^4$, $G^5$ and $G^6$, as plainly indicated in Fig. 9. The rollers $G^3$, $G^4$ and $G^6$ are journaled in a swing frame $G^7$, preferably made L-shape, and carrying at its free end an inking roller $G^8$ for inking the type $G'$ as the latter pass under the inking roller $G^8$. The frame $G^7$ is mounted to swing on a shaft $G^9$ as a fulcrum, and this shaft is journaled in suitable bearings arranged on the casing A. On the hub of the roller $G^5$ is secured a gear wheel P in mesh with a gear wheel $P'$ attached to a shaft $P^2$ journaled in the plate $A^2$ and carrying a gear wheel $P^3$ in mesh with a gear wheel $P^4$, secured on the lower end of a vertically-disposed shaft $P^5$, journaled in suitable bearings within the casing A, as plainly indicated in Fig. 3. On the upper end of the shaft $P^5$ is secured a bevel gear wheel $P^6$ in mesh with a bevel gear wheel $P^7$ secured on the rear end of the shaft $J^4$ driven by the clock C, as previously explained so that a continuous rotary motion is given to the shafts $P^5$ and $P^2$ by the gearing above described, and the rotary motion of the shaft $P^2$ is transmitted by the gear wheels $P'$ and P to the roller $G^5$, to cause the belt $G^2$ to travel continually and in unison with the clock C. The type $G'$ on the endless belt $G^2$ is arranged to represent the hours and half-hours of a whole day, it being understood that an impression of one of the types $G'$ is made on the record blank D whenever thirty lines $D'$ have passed the flat surface of the platen O, so that the hours and half-hours of the day are printed on the record blank D at the corresponding lines $D'$, and preferably at the upper end thereof.

In order to impart the necessary swinging motion to the frame $G^7$, to cause the corresponding type $G'$ to make the impression on the record blank D at the proper line $D'$, the following arrangement is made: On the shaft $G^9$ is loosely mounted a sleeve Q having an arm $Q'$ carrying a pawl $Q^2$ engaging a ratchet wheel $Q^3$, secured to the face of the gear wheel P employed for rotating the roller $G^5$, with a view to impart a traveling motion to the type belt $G^2$, as previously explained. On the sleeve Q is secured or formed an arm $Q^4$, adapted to drop into the notches of a toothed wheel $Q^5$, secured on the lower end of the shaft I, so as to rotate with the shaft I when the latter is rotated, that is, whenever the vehicle is running and the gear wheel $I^3$ is in mesh with the gear wheel J. The arm $Q^4$ is pressed on by a spring $Q^6$ to hold the arm $Q^4$ in engagement with the wheel $Q^5$. By the arrangement described the wheel $Q^5$ periodically imparts a swinging motion to the arm $Q^4$ secured on the sleeve Q, to rock the latter, which by the arm $Q'$ and the pawl $Q^2$ causes a rocking motion of the frame $G^7$, by the action of the pawl $Q^2$ engaging the ratchet wheel $Q^3$. It is understood that the type band $G^2$ is tightly stretched over the wheels $G^3$, $G^4$, $G^5$ and $G^6$, so that the frame $G^7$ is normally held in the position shown in Fig. 9, and when the sleeve Q is rocked the wheel $G^5$ is caused to turn in the reverse direction, and as the frame $G^7$ is mounted with a running fit on the hub of the wheel $G^5$, it is evident that the frame $G^7$ is rocked to cause an impression of the corresponding type $G'$ on the record blank. From the foregoing it will be seen that although the type belt $G^2$ travels continually in unison with the clock C, no impressions by the type $G'$ of the type belt $G^2$ on the record blank D are made unless the vehicle is running, as only then a rocking motion is periodically given to the frame $G^7$, as above explained.

The record blank D after leaving the platen O passes around a guide roller $O'$, and then the record blank extends in the rear of the glass plate $A'$ from the roller $O'$ to and around a driven feed roller $O^2$ journaled on the plate $A^2$, the record blank D then passing around an idler $O^3$, to finally pass to the winding-up spool $H'$ to be wound up thereon (see Fig. 5). The record blank D is held in firm contact with the roller $O^2$ by a roller $O^4$ journaled on an arm $O^5$ mounted to swing on the plate $A^2$, and pressed on by a spring $O^6$, to normally hold the roller $O^4$ in firm contact with the record blank D opposite the roller $O^2$. When it is desired to insert a new record blank, it is necessary to swing the arm $O^5$ outward to the position shown in dotted lines in Fig. 5, to permit the operator to conveniently place the record blank around the roller $O^2$, after which the arm $O^5$ is returned to its normal pressing position. The roller $O^2$ is driven from the gear wheel $N^2$, and for this purpose the gear wheel $N^2$ meshes with an intermediate gear wheel $N^4$ in mesh with a gear wheel $N^5$ secured on the shaft of the roller $O^2$. Thus when the vehicle is running and the shaft I is driven, a rotary motion is given to the roller $O^2$ by the gear wheels $N^3$, $N^2$, $N^4$, $N^5$ to assist in pulling the record blank along, and to finally wind the same on the winding-up spool $H'$.

The record blank D in passing from the roller $O'$ to the driven roller $O^2$ passes over a platen $O^7$ fixed on the plate $A^2$, and in front of this platen $O^7$ and in front of the record blank D operates the tracer or stylus F, mounted to turn on a rod $F'$ and pressed on by a torsion string $F^2$, attached to the rod $F'$, so that the tracer F moves up and down with the rod $F'$, and at the same time is held with its free end in firm contact with the face of the record blank D by the action of the spring $F^2$. The rod $F'$ is mounted to slide up and down in an insulated bearing $A^4$ held on the plate A², and the lower end of the rod F' is pivotally connected with an arm F³, attached to a shaft F⁴, extending transversely, and journaled in bearings held on insulating brackets A⁵ attached to the plate A². A spring F⁵ presses the arm F³, to swing the arm F³ in an upward direction. On the shaft F⁴ is secured an arm F⁶, carrying a friction roller F⁷ in contact with the peripheral face of a cam F⁸, secured on a shaft R, journaled in suitable bearings arranged in the lower rear portion of the casing A, as plainly shown in Figs. 5 and 6. On the shaft R is secured a worm wheel R' in mesh with a worm R², attached to a transverse shaft R³ journaled in the casing A and carrying at its front end a worm wheel R⁴ in mesh with a worm R⁵ secured on the shaft B' of the speedometer B, so that when the vehicle is running a rotary motion is transmitted by the shaft B' to the shafts R³ and R, to cause the cam F⁸ to impart a swinging motion to the arm F⁶, with a view to rock the shaft F⁴ and to cause the arm F³ to move the rod F' and the tracer F up and down. Now as the tracer F is in contact with the prepared record paper, and the tracer F is electrically connected with one pole of the battery, as indicated in Fig. 6, and the platen O⁴ is attached to the plate A², connected with the other pole of the battery, it is evident that an electrical current passes from the platen O⁴ by way of the record blank D to the stylus F, so that the distance line D³ is produced on the face of the record blank across the minute lines D'. It is understood that if the vehicle travels slowly the tracer F is correspondingly moved up and down on the record blank D, and when the vehicle travels fast, the tracer F moves up and down oftener in a given time. Thus the distance line D³ traced across the minute lines D' on the traveling record blank D graphically indicates the mileage and speed per hour at the time the vehicle is running. In order to insure the formation of distinct minute lines D', the record blank D is preferably moistened at the back by a sponge S arranged adjacent to the roller O'.

The operation is as follows: When the vehicle is at a standstill the speedometer B, the means for imparting a traveling motion to the record blank D and the printing devices for producing the lines D' and D³ and the time D² are inactive, although the clock C is running and the type belt G² is traveling in unison with the clock. When the vehicle is running the rotary motion of the flexible shaft B' causes the centrifugal governor B² to straighten out, so that the centrifugal governor B² drives the wheel K² from the left to the right, to allow the spring I² to move the gear wheel I³ in mesh with the gear wheel J. When this takes place the shaft I is rotated from the gearing connected with the clock C, to cause the record blank D to travel, that is, to unwind from the spool H and to wind up on the spool H'. The record blank D as it passes between the bar E and the spring arm E' is periodically pressed by the spring arm against the bar E, to receive the minute lines D', as previously explained, and the time D² is printed on the upper ends of the said line by the types G' held on the endless apron G² mounted on the lever G⁷ periodically actuated by the mechanism previously described. The distance line D³ is produced on the record blank D by the stylus F, continually moved up and down by the mechanism connected with the speedometer, it being understood that one stroke of the tracer F represents one-half mile of travel of the automobile, and consequently if the automobile is going at sixty miles an hour the tracer F travels up and down between two adjacent minute lines D', and if one stroke extends from one minute line to the other, the automobile is going at thirty miles an hour, and so on; the line D³ with the lines D' thus graphically representing the mileage as well as the speed per hour. In addition, the time D² printed on the record blank, tells exactly at what speed the automobile was traveling at any given hour. When the automobile comes to a standstill the centrifugal governor B² allows the wheel K² to return, and in doing so, the wheel K² acts on the lever K, which moves the gear wheel I³ out of mesh with the gear wheel J. When this takes place the record blank D and the tracer F cease to travel and the rock frame G⁷ comes to a standstill.

Having thus described my invention, I claim as new and desire to secure by Letters Patent:

1. In a speed recorder for vehicles, in combination, a clock mechanism, a speedometer driven by the vehicle, a time recorder driven by the clock mechanism and controlled by the said speedometer, a distance indicator driven by the said speedometer, and a record blank on which mark both the time recorder and the distance indicator.

2. In a speed recorder, the combination with a clock movement and a speedometer, of a record blank, means operated by the clock movement for moving the blank, recording mechanism operated by the speedometer, and means in connection with the speedometer for disconnecting the clock movement from the record blank moving means when the speedometer is idle.

3. In a speed recorder, the combination with a clock movement and a speedometer, of a record blank, means operated by the clock movement for moving the blank, means for periodically marking spaced time lines on the record blank, means for marking the distance traveled on the record blank, means whereby the speedometer will operate both of said last named means, and means in connection with the speedometer for disconnecting the clock movement from the record blank moving means, when the speedometer is idle.

4. A speed recorder, provided with supporting means for carrying a record blank, a clock-driven mechanism for imparting motion to the said supporting means, to cause the record blank to travel, a line-marking device for marking spaced minute lines on the record blank and controlled by the said clock-driven mechanism, a time-marking device controlled by the said clock-driven mechanism for marking the time on the record blank, a speedometer for throwing the said clock-driven mechanism into or out of gear, and a distance-marking device controlled by the said speedometer for marking a distance-indicating line on the said record blank across the said minute lines.

5. A speed recorder, provided with a speedometer, a clock-driven gearing, a shifting mechanism controlled by the said speedometer for throwing the said gearing into or out of action, a supporting means for a record blank and driven from the said gearing, and an electric printing device controlled by the said gearing for producing marks on the said record blank.

6. A speed recorder, provided with a speedometer, a clock-driven gearing, a shifting mechanism controlled by the said speedometer for throwing the said gearing into or out of action, a supporting means for a record blank and driven from the said gearing, and an electric printing device controlled by the said gearing for producing minute lines on the said record blank transverse to the travel of the record blank.

7. A speed recorder, provided with a speedometer, a clock-driven gearing having a shifting mechanism controlled by the said speedometer for throwing the said gearing into or out of action, a supporting means for a record blank and driven from the said gearing, an electric printing device controlled by the said gearing for producing minute lines on the said record blank transverse to the travel of the record blank, and a second electric printing device controlled by the said gearing for producing a distance line on the said record blank across the said minute lines.

8. A speed recorder provided with a clock-driven mechanism, a record blank supporting mechanism driven from the said driven mechanism, a fixed contact bar for the record blank to be pressed against, and means controlled by the said clock-driven mechanism for pressing the record blank periodically in contact with the said bar.

9. A speed recorder provided with a clock-driven mechanism, a record blank supporting mechanism driven from the said driven mechanism, a fixed contact bar for the record blank to be pressed against, means controlled by the said clock-driven mechanism for pressing the record blank periodically in contact with the said bar, the said means comprising a ratchet wheel driven by the said clock-driven mechanism, and a spring arm in contact with the ratchet wheel and adapted to engage the record blank opposite the said contact bar, to press the record blank against the bar.

10. In a speed recorder, the combination, of a speedometer, a chemically-prepared record blank, a supporting and driving device for the record blank, a clock-driven mechanism for driving the said blank supporting device, a shifting mechanism controlled by the said speedometer for throwing the said clock-driven mechanism in or out of gear, an electric minute-line printing device actuated from the said clock-driven mechanism, for periodically producing minute lines on the said record blank, an electric tracing device controlled by the speedometer for tracing a distance line on the said record blank, and a time printing device controlled by the said clock-driven mechanism for printing the time on the said record blank.

11. A speed recorder for vehicles, provided with a traveling and chemically-prepared record blank, an electric line printing device for producing minute lines on the said record blank, an electric tracing device for tracing a distance line on the said record blank across the minute lines, and an ink time-printing device for printing the time on the said record blank at the said minute lines.

12. A speed recorder provided with a clock-driven mechanism, supporting means for a record blank and driven from the said clock-driven mechanism, and a time-printing device for printing the time on the said record blank, and having a rock frame controlled periodically from the clock-driven mechanism, a type-carrying apron mounted to travel on the said rock frame, and means for continually driving the said apron from the said clock-driven mechanism.

13. In a speed recorder, the combination with a clock movement and a speedometer, of a record blank, means operated by the clock movement for moving the blank, a fixed platen over which the blank moves, a time printing device opposite the platen and operated by the clock movement to print the time upon the record blank, recording mechanism driven by the speedometer, and means in connection with the speedometer for disconnecting the clock movement from the record moving means when the speedometer is idle.

14. In a speed recorder, the combination with a clock movement, and a speedometer, of a record blank, means operated by the clock movement for moving the blank, a fixed platen over which the blank moves, a tracer opposite the platen, a speedometer controlling the tracer, an electric circuit connected with the fixed platen and the tracer, and means for disconnecting the clock movement from the record moving means when the speedometer is idle.

In testimony whereof I have signed my name to this specification in the presence of two subscribing witnesses.

GEORGE A. LEE.

Witnesses:
　THEO. G. HOSTER,
　JOHN P. DAVIS.